(12) United States Patent
Komoguchi et al.

(10) Patent No.: US 9,481,299 B2
(45) Date of Patent: Nov. 1, 2016

(54) WARNING DEVICE FOR A POSSIBLE VEHICLE COLLISION BASED ON TIME AND DISTANCE

(75) Inventors: Tetsuya Komoguchi, Nagakute (JP); Yoshihiko Takahashi, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 97 days.

(21) Appl. No.: 14/417,999

(22) PCT Filed: Aug. 9, 2012

(86) PCT No.: PCT/JP2012/070367
§ 371 (c)(1),
(2), (4) Date: Jan. 28, 2015

(87) PCT Pub. No.: WO2014/024294
PCT Pub. Date: Feb. 13, 2014

(65) Prior Publication Data
US 2015/0298611 A1    Oct. 22, 2015

(51) Int. Cl.
*G08B 21/00*    (2006.01)
*B60Q 9/00*     (2006.01)
*G08G 1/16*     (2006.01)

(52) U.S. Cl.
CPC .............. *B60Q 9/008* (2013.01); *G08G 1/166* (2013.01); *G08G 1/168* (2013.01)

(58) Field of Classification Search
CPC ....................................... B60Q 9/008
USPC .............. 340/435, 436, 901, 902, 903, 904; 701/301
See application file for complete search history.

(56) References Cited

U.S. PATENT DOCUMENTS

2014/0028451 A1    1/2014    Takahashi et al.

FOREIGN PATENT DOCUMENTS

| | | |
|---|---|---|
| JP | 2009-116741 A | 5/2009 |
| JP | 2010-102641 A | 5/2010 |
| JP | 2011-053799 A | 3/2011 |
| JP | 2012-048460 A | 3/2012 |
| JP | 5435172 B2 | 3/2014 |
| WO | 2014/010066 A1 | 1/2014 |

*Primary Examiner* — Jeffery Hofsass
(74) *Attorney, Agent, or Firm* — Oliff PLC (57) ABSTRACT

When a warning is generated for a driver of a host vehicle based on approach information about a moving object, a selection between a first warning method and a second warning method is determined in accordance with the moving direction of the moving object with respect to the host vehicle. In the first warning method, a predicted collision time, which is the predicted amount of time before the moving object will collide with the host vehicle, is calculated based on the approach information, and the driver is warned only when the predicted collision time is less than a threshold value. In the second warning method, the distance between the moving object and the host vehicle is obtained as the approach information, and the driver is warned only when that distance is a value that corresponds to a value within a warning range.

8 Claims, 5 Drawing Sheets

WARNING DEVICE FOR A POSSIBLE VEHICLE COLLISION BASED ON TIME AND DISTANCE

TECHNICAL FIELD

The present invention relates to a warning device for a vehicle.

BACKGROUND ART

As described in Patent Document 1, a vehicle such as an automobile includes a warning device for generating a warning for the driver of the vehicle based on approach information about a moving object approaching the vehicle. Based on whether there is such a moving object and the distance and relative speed between the moving object and the vehicle, the warning device determines a collision prediction time, which is the time predicted to elapse before the moving object hits the vehicle. If the collision prediction time is less than a threshold value, the warning device generates a warning for the driver of the vehicle by illuminating a warning lamp or generating a warning sound. By warning the driver based on the collision prediction time in the above-described manner, the warning device generates a warning appropriately in accordance with the distance and relative speed between the vehicle and the moving object when the vehicle travels on the road.

PRIOR ART DOCUMENTS

Patent Documents

Patent Document 1: Japanese Laid-Open Patent Publication No. 2010-102641

SUMMARY OF THE INVENTION

Problems that the Invention is to Solve

When a driver attempts to park or start a vehicle in a parking lot or the like, the vehicle (the driver's vehicle) may be approached by another vehicle. In this case, in which the other vehicle in the parking lot corresponds to a moving object approaching the driver's vehicle, the other vehicle approaches the driver's vehicle with the tendency described below.

Figure 5:
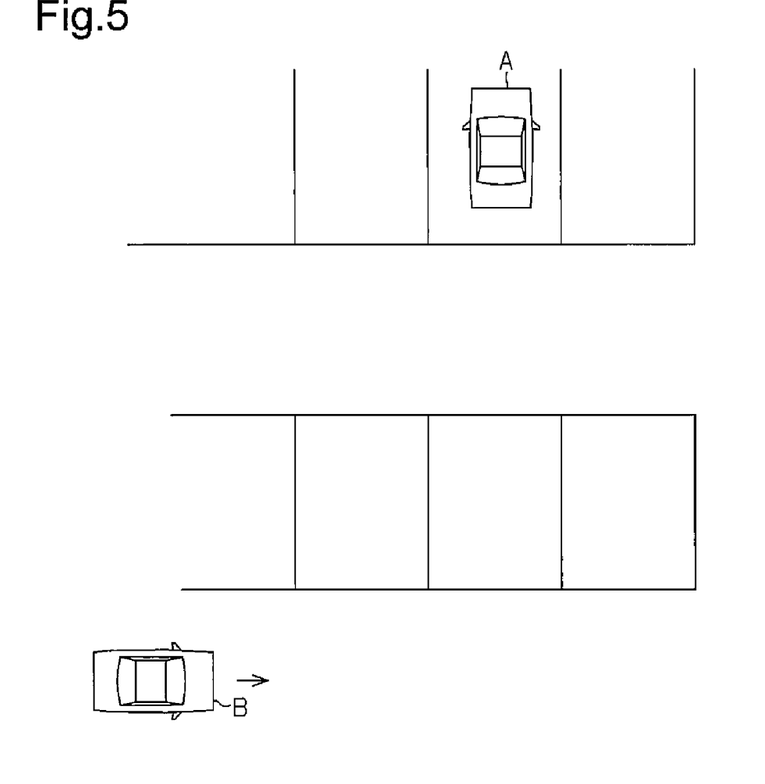
FIG. 5 is a plan view representing a specific example of the moving object approaching the vehicle.
Figure 6:
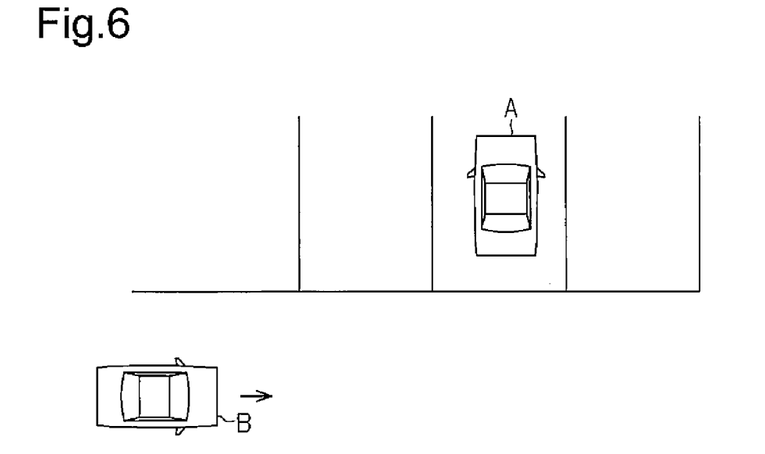
FIG. 6 is a plan view representing a specific example of the moving object approaching the vehicle.
Figure 7:
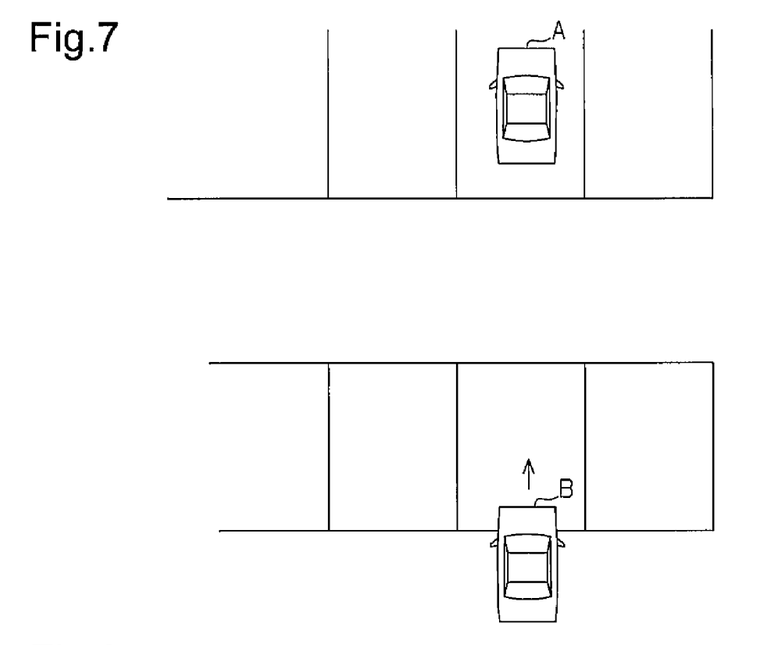
FIG. 7 is a plan view representing a specific example of the moving object approaching the vehicle.

That is, if the other vehicle approaches the driver's vehicle in the widthwise direction of the driver's vehicle, clear correlation is not necessarily noted between the distance between the other vehicle and the driver's vehicle and the speed at which the other vehicle approaches the driver's vehicle. Specifically, when the other vehicle B is spaced from the driver's vehicle A as illustrated in FIG. 5, the approaching speed of the other vehicle B toward the driver's vehicle A may be either great or small. Also, when the other vehicle B is close to the driver's vehicle A as shown in FIG. 6, the approaching speed of the other vehicle B toward the driver's vehicle A may be either great or small. In contrast, for cases in which the other vehicle approaches the driver's vehicle in the front-rear direction of the driver's vehicle, the approaching speed of the other vehicle B toward the driver's vehicle A may be either great or small if the other vehicle B is spaced from the driver's vehicle A as illustrated in FIG. 7 but tends to be small if the other vehicle B is close to the driver's vehicle A as shown in FIG. 8.

Figure 8:
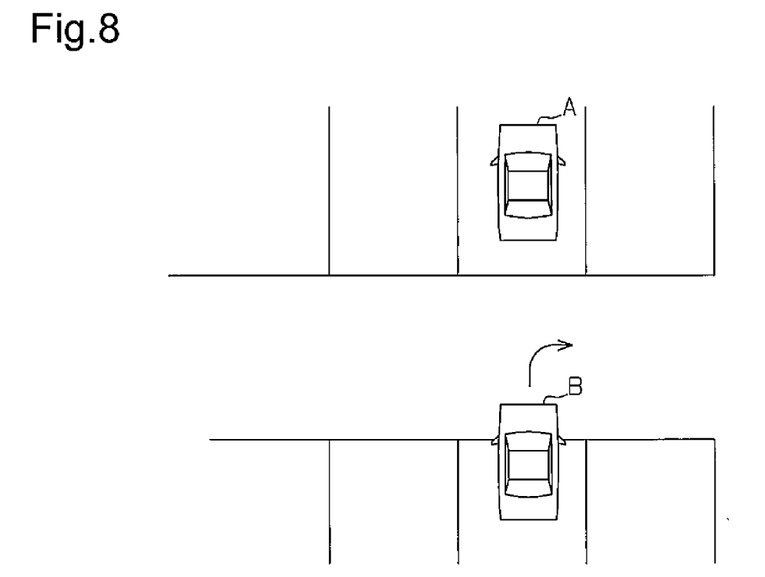
FIG. 8 is a plan view representing a specific example of the moving object approaching the vehicle.

Accordingly, a warning cannot be generated correctly if the warning is based on the aforementioned collision prediction time in the case shown in FIG. 8, where the other vehicle B approaches the driver's vehicle A in the front-rear direction of the driver's vehicle A in a parking lot, the distance between the other vehicle B and the driver's vehicle A is small, and the approaching speed of the other vehicle B toward the driver's vehicle A is small. This problem is caused by the fact that, when the approaching speed of the other vehicle B toward the driver's vehicle A is small, the collision prediction time does not become less than the threshold value even if the distance between the other vehicle B and the driver's vehicle A is small. Further, when the other vehicle B approaches the driver's vehicle A in the front-rear direction of the driver's vehicle A in a parking lot, the distance between the other vehicle B and the driver's vehicle A is great as illustrated in FIG. 7, and the approaching speed of the other vehicle B toward the driver's vehicle A is great, a collision between the other vehicle B and the driver's vehicle A is unlikely to occur. However, in this case, if a warning is generated based on the collision prediction time, the warning may be generated erroneously. This problem is caused by the fact that, when the approaching speed of the other vehicle B toward the driver's vehicle A is great, the collision prediction time becomes less than the threshold value even if the distance between the other vehicle B and the driver's vehicle A is sufficiently great to restrain a collision between the vehicles A and B.

Accordingly, it is an objective of the present invention to provide a warning device for a vehicle that generates a correct warning and restrains an erroneous warning in a parking lot or the like.

Means for Solving the Problems

To generate a warning for the driver of a vehicle based on approach information about a moving object approaching the vehicle, the warning device for a vehicle according to the present invention is capable of generating the warning by the first warning section and the second warning section. The first warning section calculates a collision prediction time, which is time predicted to elapse before a collision between the moving object and the vehicle, based on the approach information about the moving object, and generates a warning for the driver if the collision prediction time is less than a threshold value. The second warning section obtains a distance between the moving object and the vehicle as the approach information about the moving object and generates a warning for the driver only when the distance is a value in a warning range. The warning section employed to generate a warning for the driver is switched between the first warning section and the second warning section in accordance with a moving direction of the moving object with respect to the vehicle. Accordingly, if the moving direction of the moving object with respect to the vehicle is the widthwise direction of the vehicle, the first warning section is employed to generate a warning for the driver. If the moving direction of the moving object with respect to the vehicle is the front-rear direction of the vehicle, the second warning section is employed to generate a warning for the driver.

By employing the second warning section to generate a warning for the driver when the moving direction of the moving object with respect to the vehicle is the front-rear direction of the vehicle, the warning for the driver is correctly generated and an erroneous warning is restrained. Specifically, if the first warning section were employed to generate the warning for the driver when the moving direction of the moving object with respect to the vehicle is the front-rear direction of the vehicle, the problem described below would occur. That is, if another vehicle as a moving object approaches the driver's vehicle in the front-rear direction of the driver's vehicle in a parking lot or the like and the approaching speed of the other vehicle toward the driver's vehicle may be small, the aforementioned collision prediction time does not become less than the threshold value even when the distance between the other vehicle and the driver's vehicle is small. This may hamper correct warning generation for the driver by the first warning section. Also, when another vehicle as a moving object approaches the driver's vehicle in the front-rear direction of the driver's vehicle in a parking lot or the like and the distance between the other vehicle and the driver's vehicle is sufficiently great to restrain a collision between the vehicles, the collision prediction time becomes less than the threshold value when the approaching speed of the other vehicle toward the driver's vehicle is great. This may cause the first warning section to generate an erroneous warning.

However, by employing the second warning section to generate the warning for the driver when the moving direction of the moving object (the other vehicle) with respect to the driver's vehicle is the front-rear direction of the driver's vehicle, occurrence of the above-described problems is restricted. In other words, if a warning for the driver is generated using the second warning section when the distance between the other vehicle and the driver's vehicle is in the warning range, the warning for the driver is generated regardless of whether the approaching speed of the other vehicle toward the driver's vehicle is small or great. This restricts occurrence of the above-described problem that, when the approaching speed of the other vehicle toward the driver's vehicle is small, a warning for the driver cannot be generated correctly even if the distance between the other vehicle and the driver's vehicle is small. Also, if a warning for the driver is generated using the second warning section when the distance between the other vehicle and the driver's vehicle is out of the warning range (exceeds the warning range), the warning for the driver is not generated regardless of whether the approaching speed of the other vehicle toward the driver's vehicle is small or great. This restricts occurrence of the above-described problem that, even though the distance between the other vehicle and the driver's vehicle is sufficiently great to restrain a collision between the vehicles, a warning for the driver is erroneously generated if the approaching speed of the other vehicle toward the driver's vehicle is great.

To switch the warning section employed to generate a warning for the driver between the first warning section and the second warning section, it is preferable to determine the inclination angle of the moving direction of the moving object (the other vehicle or the like) with respect to the moving direction of the driver's vehicle and switch the warning sections in accordance with the inclination angle.

In accordance with one aspect of the present invention, when the inclination angle is between 0° and a reference value, the warning section employed to generate a warning for the driver is switched to the second warning section. When the inclination angle is between 0° and the reference value, it is indicated that the moving direction of the moving object (the other vehicle or the like) approaching the driver's vehicle is the front-rear direction of the driver's vehicle. Accordingly, by employing the second warning section to generate a warning for the driver when the inclination angle is between 0° and the reference value, the second warning section is used correctly to generate the warning for the driver when the moving direction of the moving object with respect to the driver's vehicle is the front-rear direction of the driver's vehicle.

In accordance with one aspect of the present invention, when the inclination angle is between 90° and a reference value, the warning section employed to generate a warning for the driver is switched to the first warning section. When the inclination angle is between 90° and the reference value, it is indicated that the moving direction of the moving object (the other vehicle or the like) approaching the driver's vehicle is the widthwise direction of the driver's vehicle. Accordingly, by employing the first warning section to generate a warning for the driver when the inclination angle is between 90° and the reference value, the first warning section is used correctly to generate the warning for the driver when the moving direction of the moving object with respect to the driver's vehicle is the widthwise direction of the driver's vehicle.

The reference value is preferably set to such a value that allows a determination that the moving direction of the moving object is a front-rear direction of the vehicle to be made if the inclination angle is between 0° and the reference value.

MODES FOR CARRYING OUT THE INVENTION

One embodiment of the present invention will now be described with reference to FIGS. 1 to 4.

Figure 1:
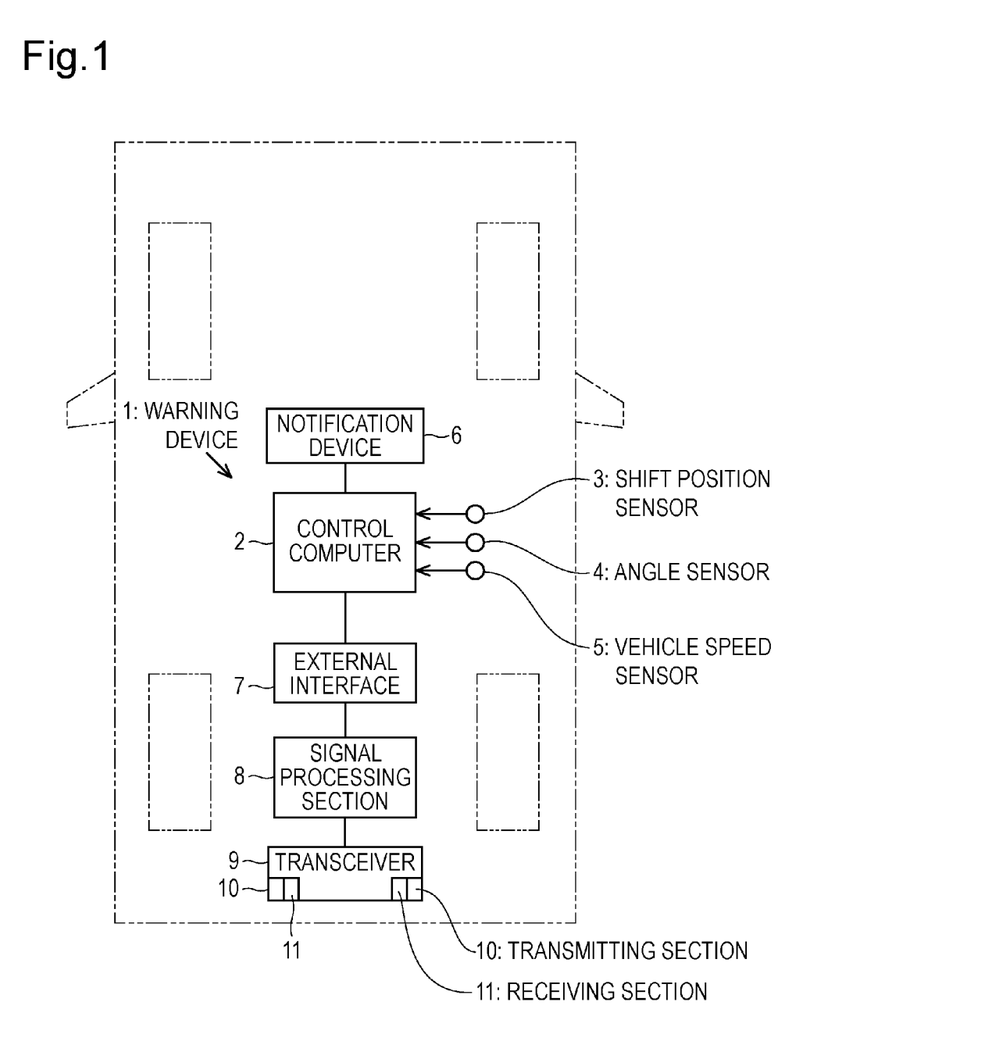
FIG. 1 is a schematic diagram representing a vehicle as a whole employing a warning device of the present invention.

A vehicle illustrated in FIG. 1 includes a warning device 1, which detects a moving object approaching the vehicle and generates a warning for the driver. The warning device 1 has a control computer 2 serving as a control section for carrying out various types of controls on the vehicle.

Various sensors for detecting operating states of the vehicle are connected to the control computer 2. The sensors include a shift position sensor 3 for outputting a signal corresponding to a shift position of a shift lever manipulated by the driver, an angle sensor 4 for detecting the steering angle of the vehicle, and a vehicle speed sensor 5 for detecting the traveling speed of the vehicle. Also, a notification device 6 for providing a warning to the driver such as a warning lamp or a beeper is connected to the control computer 2. A signal processing section 8 is also connected to the control computer 2 through an external interface 7 and a transceiver 9 is connected to the signal processing section 8.

The transceiver 9 transmits a detection wave and receives a reflected wave, which is the reflected detection wave. Specifically, the transceiver 9 includes a plurality of transmitting sections 10 and a plurality of receiving sections 11. The transmitting sections 10 transmit millimeter waves as the detection waves in different directions to positions rearward of the vehicle. The receiving sections 11 receive the reflected waves, which are the reflected detection waves transmitted from the transmitting sections 10. Specifically, each transmitting section 10 may be paired with one of the receiving sections 11. The respective pairs are arranged at positions in, for example, a side mirror, a fender body, or a rear bumper of the vehicle.

The signal processing section 8 monitors transmission of the detection waves and reception of the reflected waves by the transceiver 9. Based on the time (the transmission time) from transmission of a detection wave to reception of a corresponding reflected wave and the frequency difference between the detection wave and the reflected wave caused due to the Doppler effect, the signal processing section 8 detects a moving object approaching the vehicle. The signal processing section 8 then calculates the distance and relative speed between the moving object and the vehicle and determines the moving direction of the moving object. The signal processing section 8 outputs, to the vehicle to the control computer 2 via the external interface 7, a determination as to whether there is such a moving object, the distance between the moving object and the vehicle, the relative speed between the moving object and the vehicle, and the moving direction of the moving object as approach information about the moving object with respect to the vehicle.

Based on the approach information about the moving object provided by the signal processing section 8, the control computer 2 operates the notification device 6 to turn on a warning lamp or generate a warning sound from a beeper. Through such operation of the notification device 6, the driver is given a warning about the moving object approaching the vehicle. To generate the warning for the driver, the control computer 2 performs warning by a first warning method or warning by a second warning method. The control computer 2 and the notification device 6 function as a first warning section for performing the warning by the first warning method or a second warning section for performing the warning by the second warning method.

Figure 2:
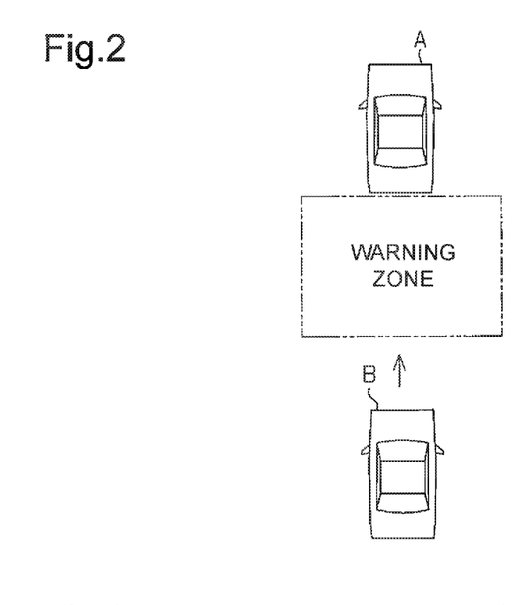
FIG. 2 is a plan view showing a zone in which the distance between the vehicle and a moving object is in a warning range.

To generate a warning by the first warning method, a collision prediction time, which is the time predicted to elapse before the moving object hits the vehicle, is calculated based on the approach information about the moving object. A warning for the driver is then generated only when the obtained collision prediction time is less than a threshold value. To generate a warning by the second warning method, the distance between the moving object and the vehicle is obtained as the approach information about the moving object. A warning for the driver is then generated only when the distance is a value corresponding to a warning range. The warning range may be a range from 0 to an optimal value that has been determined in advance through experimentation or the like. In FIG. 2, the zone in which the distance between the moving object (the other vehicle B) approaching the vehicle (the driver's vehicle A) and the driver's vehicle A falls in the warning rage is represented by the long dashed double-short dashed lines.

Figure 3:
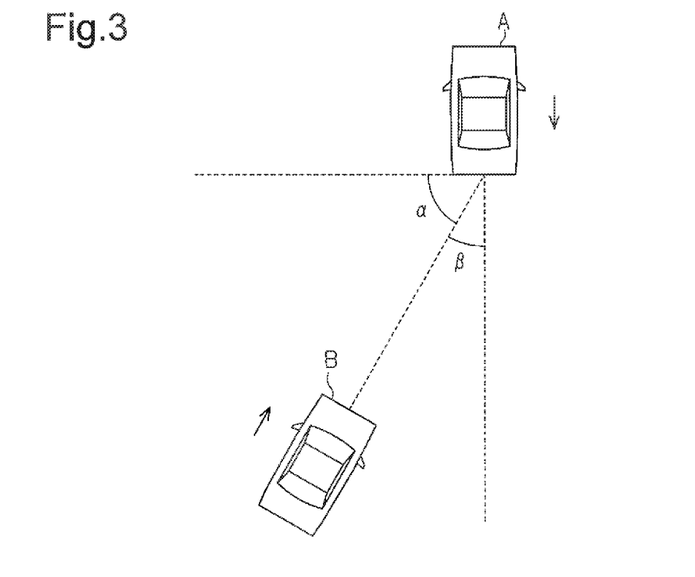
FIG. 3 is a plan view showing a specific example of the moving object approaching the vehicle.

Selection between warning by the first warning method and warning by the second warning method for generating a warning for the driver is performed by the control computer 2 in accordance with the moving direction of the moving object with respect to the vehicle. Specifically, an inclination angle $\beta$ of the moving direction of the moving object with respect to the moving direction (the front-rear direction) of the vehicle is determined. In accordance with the inclination angle $\beta$, the warning method for generating a warning for the driver is switched between the first warning method and the second warning method. To perform such switching, the control computer 2 functions as a switching section. FIG. 3 illustrates an example of a case where the inclination angle $\beta$ is a value in the range from 0° and 90°. As is clear from the drawing, the inclination angle $\beta$ and the angle $\alpha$ of the drawing exhibit the relationship represented by the expression: $\alpha+\beta=90°$.

The selection between warning by the first warning method and warning by the second warning method for generating a warning for the driver is carried out in accordance with the aforementioned inclination angle $\beta$. That is, if the inclination angle $\beta$ is between 90° and a predetermined reference value, the warning by the first warning method is selected as warning for the driver. In contrast, if the inclination angle $\beta$ is between 0° and the reference value, the warning by the second warning method is selected as the warning for the driver. Specifically, the reference value may be set to satisfy Condition 1 and Condition 2, which will be described below, for example. [Condition 1] is that, when the inclination angle $\beta$ is between 0° and the reference value and, a determination that the moving direction of the moving object approaching the vehicle is the front-rear direction of the vehicle can be made reliably. [Condition 2] is that, when the inclination angle $\beta$ is between 90° and the reference value and, a determination that the moving direction of the moving object approaching the vehicle is the widthwise direction of the vehicle can be made reliably.

Operation of the warning device 1 according to the illustrated embodiment will now be described.

To generate a warning for the vehicle's driver based on the approach information about the moving object (the other vehicle B) approaching the vehicle (the driver's vehicle A), warning by the first warning method is selected as warning for the driver if the inclination angle $\beta$ is between 90° and the reference value, as has been described. If the inclination angle $\beta$ is between 90° and the reference value, it is indicated that the moving direction of the moving object approaching the vehicle is the widthwise direction of the vehicle (the left-right direction as viewed in FIG. 3). When it is determined that the moving object approaching the vehicle moves in the widthwise direction of the vehicle, the warning by the first warning method is employed as the warning for the driver. In the first warning method, the collision prediction time of the moving object with respect to the vehicle is calculated based on the approach information about the moving object with respect to the vehicle. A warning for the driver is generated only when the calculated collision prediction time is less than the threshold value. By generating the warning for the driver based on the collision prediction time of the moving object with respect to the vehicle in this manner, the warning is provided appropriately in accordance with the distance and relative speed between the moving object and the vehicle, when the vehicle travels on the road.

In contrast, if the inclination angle $\beta$ is between 0° and the reference value when a warning for the driver of the vehicle should be generated based on the approach information about the moving object (the other vehicle B) approaching the vehicle (the driver's vehicle A), warning by the second warning method is selected as warning for the driver. If the inclination angle β is between 0° and the reference value, it is indicated that the moving direction of the moving object approaching the vehicle is the front-rear direction of the vehicle (the up-down direction of FIG. 3). When it is determined that the moving object approaching the vehicle moves in the front-rear direction of the vehicle, the warning by the second warning method is employed as the warning for the driver. In the second warning method, the distance between the moving object and the vehicle is obtained as the approach information about the moving object with respect to the vehicle. A warning for the driver is generated only when the obtained distance is a value corresponding to the warning range.

In this state, if the first warning section were employed to generate a warning for the driver, the problem described below would occur. That is, when the other vehicle B as a moving object approaches the vehicle (the driver's vehicle A) in the front-rear direction of the driver's vehicle A in a parking lot or the like and the approaching speed of the other vehicle B toward the driver's vehicle A is small, the collision prediction time does not become less than the threshold value even if the distance between the other vehicle B and the driver's vehicle A is small. This may hamper correct warning generation for the driver. Also, when the other vehicle B as a moving object approaches the driver's vehicle A in the front-rear direction of the driver's vehicle A in a parking lot or the like, the distance between the other vehicle B and the driver's vehicle A may be sufficiently great to restrain a collision between the vehicles A and B. However, in this case, if the approaching speed of the other vehicle B toward the driver's vehicle A is great, the collision prediction time becomes less than the threshold value and thus causes erroneous warning generation.

However, when the moving direction of the moving object (the other vehicle B) with respect to the driver's vehicle A is the front-rear direction of the driver's vehicle A in a parking lot or the like, warning by the second warning method is used as warning for the driver, as has been described. This restricts occurrence of the problem described above. In other words, when the distance between the other vehicle B and the driver's vehicle A is in the warning range, the second warning method allows generation of a warning for the driver regardless of whether the approaching speed of the other vehicle B toward the driver's vehicle A is small or great. This restricts occurrence of the aforementioned problem that a warning for the driver cannot be generated correctly when the distance between the other vehicle B and the driver's vehicle A is small and the approaching speed of the other vehicle B toward the driver's vehicle A is small in a parking lot or the like. Also, if the distance between the other vehicle B and the driver's vehicle A is out of the warning range (exceeds the warning range), the second warning method does not allow generation of a warning for the driver regardless of whether the approaching speed of the other vehicle B toward the driver's vehicle A is small or great. This restricts occurrence of the aforementioned problem that a warning for the driver is erroneously generated when the distance between the other vehicle B and the driver's vehicle A is great and the approaching speed of the other vehicle B toward the driver's vehicle A is great.

Figure 4:
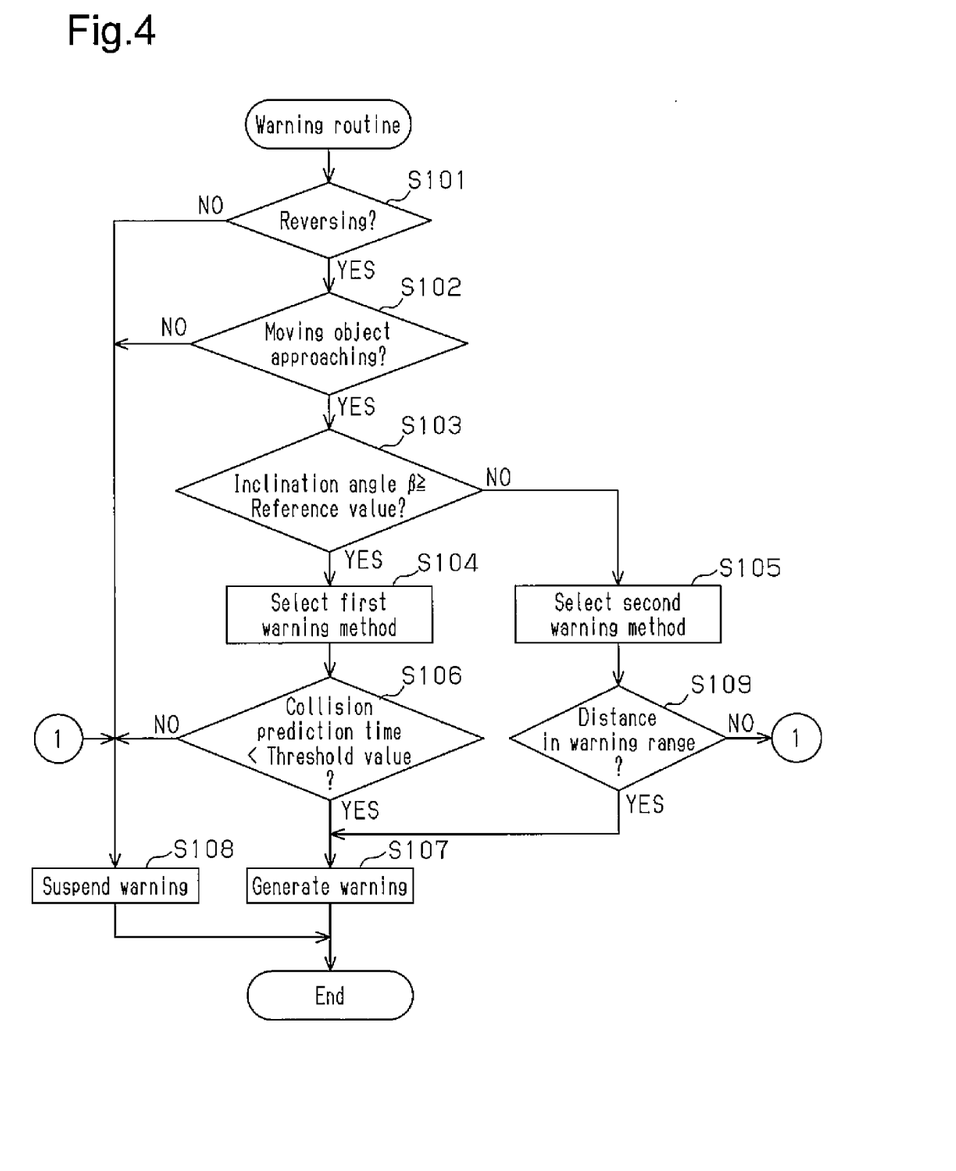
FIG. 4 is a flowchart representing a procedure of generating and suspending a warning by the warning device.

FIG. 4 is a flowchart representing a warning routine for generating and suspending a warning by the warning device 1. The warning routine is carried out through the control computer 2 periodically, for example, by time interruption at predetermined intervals.

The routine is started by determining whether the driver's vehicle A is currently reversing, or, in other words, whether the shift lever is at the reverse position, based on a signal from the shift position sensor 3 (S101). If a positive determination is made in this step, a procedure (S102 to S109) for generating a warning for the driver based on the approach information about the moving object (the other vehicle B) approaching the vehicle (the driver's vehicle A) is carried out. Although this procedure is performed only when the shift lever is manipulated to the reverse position (only when the driver's vehicle A is currently reversing) in the illustrated embodiment, the procedure may be carried out also when the shift lever is at another position than the reverse position, or, in other words, when the driver's vehicle A currently is travelling forward or in a stopped state.

In the procedure for generating a warning, it is first determined whether a moving object is approaching the driver's vehicle A based on the approach information about the moving object output from the signal processing section 8 (S102). If a positive determination is made in this step, it is determined whether the inclination angle β of the moving direction of the moving object with respect to the moving direction (the front-rear direction) of the driver's vehicle A is greater than or equal to the aforementioned reference value (S103). The inclination angle β used in this step is determined based on the approach information about the moving object provided by the signal processing section 8 and in accordance with an operating state of the driver's vehicle A. If a positive determination is made in S103, or, in other words, if the inclination angle β is between 90° and the reference value, warning by the first warning method is selected as warning for the driver (S104). In contrast, when a negative determination is made in S103, or, in other words, when the inclination angle β is between 0° and the reference value, warning by the second warning method is selected as warning for the driver (S105).

After the warning by the first warning method is selected in S104, it is determined whether the collision prediction time of the moving object approaching the driver's vehicle A with respect to the driver's vehicle A is less than the threshold value (S106). If a positive determination is made in this step, a warning for the driver is generated by turning on the warning lamp or operating the beeper to generate a warning sound (S107). If a negative determination is made in S106, the warning for the driver is suspended by turning off the warning lamp or operating the beeper to stop the warning sound (S108). In contrast, if warning by the second warning method is selected in S105, it is determined whether the distance between the moving object approaching the driver's vehicle A and the driver's vehicle A is in the warning range (S109). When a positive determination is made in this step, the procedure of S107 is carried out. If a negative determination is made, the procedure of S108 is performed. As has been described, the warning routine generates and suspends a warning by the first warning method through the procedure of S106 to S108 and, on the other hand, generates and suspends a warning by the second warning method through the procedure of S107 to S109.

The illustrated embodiment, which has been described in detail, has the advantage described below.

(1) To generate a warning for the driver based on the approach information about the moving object (the other vehicle B) with respect to the vehicle (the driver's vehicle A), selection between warning by the first warning method and warning by the second warning method is performed based on the moving direction of the moving object with respect to the vehicle. Specifically, the inclination angle β of the moving direction of the moving object with respect to the moving direction (the front-rear direction) of the vehicle is determined. In accordance with the inclination angle β, the warning method employed to generate a warning for the driver is switched between the first warning method and the second warning method. More specifically, when the inclination angle 13 is between 90° and the predetermined reference value, or, in other words, when the moving direction of the moving object approaching the vehicle is the widthwise direction of the vehicle, warning by the first warning method is employed as warning for the driver. In contrast, when the inclination angle β is between 0° and the reference value, or, in other words, when the moving direction of the moving object approaching the vehicle is the front-rear direction of the vehicle, warning by the second warning method is employed as warning for the driver. When the moving direction of the moving object (the other vehicle B) with respect to the driver's vehicle A is close to the front-rear direction of the vehicle, the warning by the second warning method is employed as the warning for the driver, as has been described, such that a correct warning for the driver is generated and an erroneous warning is restrained. In other words, this restricts occurrence of the problem that, when the approaching speed of the other vehicle B toward the driver's vehicle A is small in a parking lot or the like, a warning for the driver cannot be generated correctly even if the distance between the other vehicle B and the driver's vehicle A is small. This also restricts occurrence of the aforementioned problem that, when the distance between the other vehicle B and the driver's vehicle A is sufficiently great to restrain a collision between the other vehicle B and the driver's vehicle A in a parking lot or the like, a warning for the driver is erroneously generated if the approaching speed of the other vehicle B toward the driver's vehicle A is great.

The illustrated embodiment may be modified to the form described below.

The warning device may transmit a detection wave to positions forward of the vehicle and receive a reflected wave, which is the reflected detection wave. Using the reflected wave, the warning device generates a warning for the driver based on approach information about a moving object approaching the vehicle when the vehicle runs forward.

DESCRIPTION OF THE REFERENCE NUMERALS

1 . . . warning device, 2 . . . control computer, 3 . . . shift position sensor, 4 . . . angular sensor, 5 . . . vehicle speed sensor, 6 . . . notification device, 7 . . . external interface, 8 . . . signal processing section, 9 . . . transceiver, 10 . . . transmitting section, 11 . . . receiving section

The invention claimed is:

1. A warning device for a vehicle that generates a warning for a driver of a vehicle based on approach information about a moving object approaching the vehicle, the device comprising:

a first warning section that calculates a collision prediction time, which is time predicted to elapse before a collision between the moving object and the vehicle, based on the approach information about the moving object, and generates a warning for the driver if the collision prediction time is less than a threshold value;

a second warning section that obtains a distance between the moving object and the vehicle as the approach information about the moving object and generates a warning for the driver only when the distance is a value in a warning range; and a switching section that switches the warning section employed to generate a warning for the driver between the first warning section and the second warning section in accordance with a moving direction of the moving object with respect to the vehicle.

2. The warning device according to claim 1, wherein the switching section determines an inclination angle of the moving direction of the moving object with respect to the moving direction of the vehicle and switches the warning section employed to generate a warning for the driver between the first warning section and the second warning section in accordance with the inclination angle.

3. The warning device according to claim 2, wherein, when the inclination angle is between 0° and a reference value, the switching section switches the warning section employed to generate a warning for the driver to the second warning section.

4. The warning device according to claim 2, wherein, when the inclination angle is between 90° and a reference value, the switching section switches the warning section employed to generate a warning for the driver to the first warning section.

5. The warning device according to claim 3, wherein the reference value is set to such a value that allows a determination that the moving direction of the moving object is a front-rear direction of the vehicle to be made if the inclination angle is between 0° and the reference value.

6. The warning device according to claim 3, wherein, when the inclination angle is between 90° and the reference value, the switching section switches the warning section employed to generate a warning for the driver to the first warning section.

7. The warning device according to claim 4, wherein the reference value is set to such a value that allows a determination that the moving direction of the moving object is a front-rear direction of the vehicle to be made if the inclination angle is between 0° and the reference value.

8. The warning device according to claim 6, wherein the reference value is set to such a value that allows a determination that the moving direction of the moving object is a front-rear direction of the vehicle to be made if the inclination angle is between 0° and the reference value.

* * * * *